United States Patent
De Ruijter (10) Patent No.: US 8,515,416 B2
(45) Date of Patent: Aug. 20, 2013

(54) PERFORMING TESTING IN A RADIO DEVICE

(75) Inventor: Hendricus De Ruijter, Sunnyvale, CA (US)

(73) Assignee: Silicon Laboratories Inc, Austin, TX (US)

( * ) Notice: Subject to any disclaimer, the term of this patent is extended or adjusted under 35 U.S.C. 154(b) by 299 days.

(21) Appl. No.: 13/097,698

(22) Filed: Apr. 29, 2011

(65) Prior Publication Data

US 2012/0276853 A1    Nov. 1, 2012

(51) Int. Cl.
*H04W 24/00*    (2009.01)

(52) U.S. Cl.
USPC ..... 455/425; 455/423; 455/67.11; 455/67.13; 455/67.14; 455/67.15; 455/115.1; 455/115.2; 455/115.4; 455/226.1; 455/226.4; 714/735; 714/738; 714/739; 714/742; 714/744; 324/527

(58) Field of Classification Search
USPC ............ 455/423–425, 41.2, 500, 502, 67.11, 455/67.13, 67.14, 67.15, 115.1–115.4, 226.1–226.4; 714/703–707, 712, 715–717, 735, 738–744; 324/527, 533, 534

See application file for complete search history.

(56) References Cited

U.S. PATENT DOCUMENTS

| | | | | |
|---|---|---|---|---|
| 5,761,216 | A * | 6/1998 | Sotome et al. | 714/738 |
| 6,961,317 | B2 * | 11/2005 | Abramovitch et al. | 370/252 |
| 7,254,755 | B2 * | 8/2007 | de Obaldia et al. | 714/715 |
| 7,389,450 | B2 * | 6/2008 | Fleischer-Reumann et al. | 714/704 |
| 7,428,679 | B2 * | 9/2008 | Evans | 714/733 |
| 7,519,874 | B2 * | 4/2009 | Salant et al. | 714/704 |
| 7,561,875 | B1 * | 7/2009 | Eberle | 455/423 |
| 7,826,799 | B2 * | 11/2010 | Kolano et al. | 455/67.14 |
| 7,925,220 | B2 * | 4/2011 | Baker | 455/67.14 |
| 7,949,334 | B2 * | 5/2011 | Lorenzen | 455/425 |
| 8,074,127 | B2 * | 12/2011 | Wada et al. | 714/704 |
| 8,386,857 | B2 * | 2/2013 | Tran | 714/704 |

OTHER PUBLICATIONS

Chip Fleming, "A Tutorial on Convolutional Coding with Viterbi Decoding," Jul. 5, 2002, pp. 1-28.
Texas Instruments, "Low-Power Sub-1 GHz RF Transceiver (Enhanced CC1100)," 2011, pp. 1-101.
Silicon Laboratories, "EZRadio and EZRadio Pro," Jul. 2010, pp. 1-2.

* cited by examiner

*Primary Examiner* — Tuan A Tran
(74) *Attorney, Agent, or Firm* — Trop, Pruner & Hu, P.C.

(57) ABSTRACT

In a radio device such as a receiver or transceiver, a test operation can be performed to determine performance. A received signal can be processed to obtain demodulated samples, which can be provided to a logic to perform a logic operation on the samples to generate a logic output. A storage such as a counter or other mechanism is coupled to the logic to store a count of a number of the logic outputs having an error.

20 Claims, 6 Drawing Sheets

PERFORMING TESTING IN A RADIO DEVICE

BACKGROUND

Radios are pervasive in today's technology environment. In addition to conventional broadcast radio receivers, radio receiver and transmitter technology can be combined into a transceiver. Such transceivers are implemented throughout today's consumer products including cellular telephones, portable computers, tablet computers, personal digital assistants, personal media players and so forth. In addition, short-range wireless transceivers such as in accordance with various short-range wireless specifications provide receive and transmit functionality for many types of consumer, industrial, scientific and medical devices.

With advances in semiconductor technology, an entire transceiver can be incorporated into a single semiconductor die. Although such single-chip transceivers can be of benefit for incorporation into various systems, there can also be difficulties during manufacturing and testing. As an example, because of the amount of circuitry present in a single-chip transceivers, many tests and measurements may be required to qualify a fabricated device. In addition, to perform certain testing, additional and expensive and complicated external equipment is needed.

SUMMARY OF THE INVENTION

According to one aspect, the present invention is directed to an apparatus that includes radio circuitry such as a receiver, transmitter, or combined transceiver that includes both transmit and receive functionality.

The apparatus may include an analog front end to receive and downconvert a radio frequency (RF) signal to a second frequency signal. In turn a demodulator coupled to the analog front end can receive and demodulate the second frequency signal to obtain demodulated samples, which can include synchronization information. In turn, a logic circuit coupled to the demodulator receives the samples and performs a logic operation on the samples to generate a logic output, based on a synchronization using the synchronization information. A storage device such as a counter or other mechanism is coupled to the logic circuit to store a count of a number of the logic outputs having an error. This count can correspond to bit errors in the RF signal. The logic circuit can take different forms, including an exclusive-OR (XOR) function, a convolutional decoder or so forth.

In a particular embodiment, the apparatus may be a transceiver, and a test transmitter that generates the test pattern within the demodulated samples is part of the transceiver. In this way, single chip testing of bit error rate and other receiver/transmitter tests can be efficiently performed without complex external test circuitry. Such a transceiver that provides for testing as described herein can be incorporated in various systems.

Another aspect of the present invention is directed to a method that includes combining a test pattern of a test packet with random data to obtain whitened data, modulating the whitened data, upconverting the modulated whitened data to obtain an RF signal, and transmitting the RF signal from a transmitter. The method further includes receiving the RF signal and mixing it with a mixing signal to obtain a second frequency signal in a receiver. In turn this second frequency signal can be demodulated, a synchronization message detected and used to initiate a random generator to generate a copy of the random data responsive to detecting the synchronization message. Then the demodulated signal can be de-whitened with the copy of the random data to obtain the test pattern. For each sample of the obtained test pattern that does not equal a specified value, an error counter can be incremented. The error counter value can be used to determine a bit error rate of the receiver. In some embodiments, the RF signal can be provided from a transmit path to a receive path of a transceiver to provide for single-chip testing. In such embodiments, a second RF signal can be received in the transceiver from an external test generator and the generated RF signal used as a mixing signal.

DETAILED DESCRIPTION

In various embodiments, a testing mechanism may be provided in a radio device to enable various test mode operations including testing of companion radios or to perform self testing. One example test to be performed in various embodiments may be a bit error rate (BER) test to determine a receiver's sensitivity. Such testing can be used to test fabricated radio chips, either in a self-test mode or in a companion test mode. Furthermore, on-chip components to be used for performing the testing can be minimal, reducing complexity and on-chip real estate.

Figure 1A:
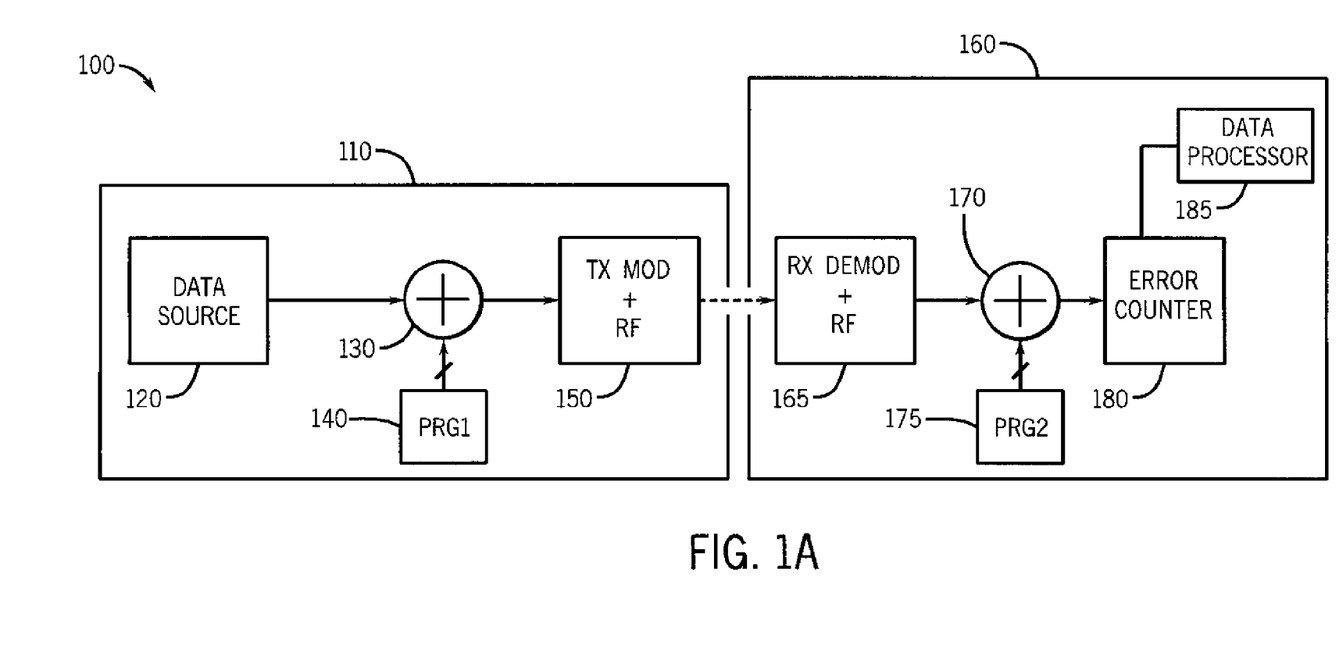
FIG. 1A is a block diagram of a test arrangement in accordance with one embodiment of the present invention.

Referring now to FIG. 1A, shown is a block diagram of a test arrangement in accordance with one embodiment of the present invention. As shown in FIG. 1A, test arrangement 100 may be used to perform testing using companion radio devices, namely a first radio device 110 and a second radio device 160, which may be transceivers of the same configuration. However, for ease of discussion with regard to the test operations, only relevant transmitter components are described with respect to first radio device 110, while only receiver components are described with respect to second radio device 160. In various embodiments, radio devices 110 and 160 each may be implemented on a single semiconductor die such as a CMOS die incorporated in an integrated circuit (IC). While the test arrangement of FIG. 1A may be performed after full manufacturing and packaging of the IC, in other embodiments testing may be performed before dicing the individual dies or after dicing but before completion of packaging. In various embodiments the radio device may be configured for short-range wireless communication such as for various ISM applications. However the scope of the present invention is not limited in this regard, and in other embodiments the radio devices may be configured for wide area wireless communications.

As seen in the test arrangement, first radio device 110 may utilize its transmitter capabilities, while in turn second radio device 160 may utilize its receiver capabilities to thus perform a BER test for purposes of second radio device 160. To test the complementary function within radio device 110, a test mode may be set to cause transmitter components of radio device 160 (not shown for ease of illustration in FIG. 1A) to be enabled while in turn enabling receiver components of first radio device 110 (not shown for ease of illustration in FIG. 1A). Note that some transmitter components (e.g., data integrity and modulation precision) within radio device 110 are implicitly tested. If radio device 110 is a reference transmitter with well-known performance, then the purpose would be to test second radio device 160.

With regard to radio device 110, shown is a data source 120. In various embodiments, the data output from data source 120 may be a predetermined data pattern for purposes of a test mode. This pattern can be provided from various circuitry, but in one example it may be provided from a first in first out (FIFO) buffer. In one embodiment, the predetermined test pattern may be of a single logic state, e.g., of a logic zero level. As seen, the predetermined test pattern may be provided to a logic circuit or unit 130 (generally, logic 130). While the scope of the present invention is not limited in this regard, in one embodiment logic unit 130 may be a combinatorial logic that implements an exclusive-OR (XOR) function. Other examples of such logic units may include more complex logic operations such as other combinations of logics, coders such as a convolutional coder, or so forth. In addition, logic 130 further receives an output from a pseudo random generator 140, which can transmit one or more bits in parallel to the logic. Using a random data pattern received from pseudo random generator 140, logic 130 may thus distort or perform a whitening function on the test data to thus output a whitened test data pattern. As an example, pseudo random generator 140 may be implemented using a linear feedback shift register (LFSR). As will be discussed further below, to provide for generation of a complementary random data pattern in second radio device 160 under test, the LFSR may have a predetermined length, number of taps and position of the taps corresponding to a predetermined initial or seed value.

This data pattern may be provided to transmitter modulation and radio frequency (RF) circuitry 150. In general, such circuitry may operate to modulate the data in accordance with a given modulation scheme. For example, in one embodiment radio device 110 may be configured to modulate data according to a frequency shift keying (FSK) modulation scheme, although other modulation schemes are possible, and radio device 110 can be controlled to transmit in a selected one of various possible modulation schemes depending on a system in which the device is implemented. In addition to modulation circuitry, various RF circuitry such as gain control circuitry, upconversion circuitry and power amplifier circuitry may be present to generate and transmit a RF signal.

Still referring to FIG. 1A, various receive components of second radio device 160 are shown. Specifically, receiver demodulator and RF circuitry 165 is present to receive and demodulate the incoming RF signals. In turn, a combinatorial logic 170 may be coupled to an output of circuitry 165 to de-whiten the demodulated data. More specifically, combinatorial logic 170 may be configured similarly to that of combinatorial logic 130 of radio device 110 and thus may further receive as an input a random data pattern from a second pseudo random generator 175.

Pseudo random generator 175 may be configured similarly to that of generator 140 of first radio device 110 to thus provide an identical (and synchronized) random data pattern to combinatorial logic 170. Thus pseudo random generator 175 may include an LFSR of the same length, taps and same initial value as that of pseudo random generator 140. In this way, combinatorial logic 170 may output de-whitened data that should correspond to the original test data pattern generated in data source 120. In the embodiment described here, assuming that the test pattern provided by data source 120 is of a single logic level, e.g., a logic low level, the corresponding output from combinatorial logic 170 should similarly be at the same logic low level. For any given bit, if it is not at the predetermined data level (e.g., logic low in this embodiment), an error counter 180 may be incremented accordingly. Note that during normal operations, demodulated and de-whitened data may instead be provided off-chip or to an on-chip data processor 185, which may take various forms in different embodiments. Note that other than the error counter shown in second radio device 160, all other components of both radio devices may be used during normal radio operations, and thus a minimal amount of additional hardware can be provided to perform testing.

Accordingly, companion chip testing may be realized by configuring transmit operations in first radio device 110 to thus transmit a predetermined test pattern while in turn configuring second radio device 160 to perform corresponding receive operations to determine a BER for radio device 160. Of course, as discussed above in a further test mode to test the BER of radio device 110, the radio devices can be configured such that receiver circuitry of radio device 110 is enabled and transmit circuitry of radio device 160 is enabled. While shown with this particular implementation in the embodiment of FIG. 1A, understand the scope of the present invention is not limited in this regard. For example, while not shown in FIG. 1A, the connection between chips may be via separate antennas coupled to pads of each chip, e.g., for a field test. In other embodiments, direct connection of the chips can be used for board/device characterization. An attenuator can be connected in between to establish the receive sensitivity, or receive selectivity can be measured by adding an interfering RF signal.

Figure 1B:
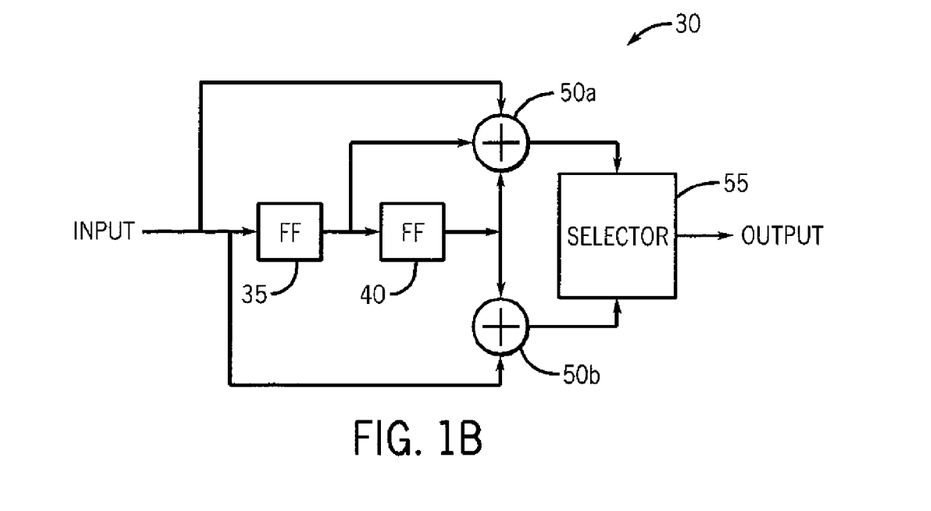
FIG. 1B is a block diagram of a logic unit used in a test arrangement in accordance with one embodiment of the present invention.

Also in other embodiments different types of logic circuitry may be provided rather than the combinatorial logic shown in FIG. 1A. For example, in another embodiment, a convolutional coder can be used as the logic circuitry. As seen in FIG. 1B, in general convolutional coder 30 receives an input, delays the input and combines the input and delayed input(s) to generate a selected output. In the embodiment of FIG. 1B, an input signal may be provided to one or more delay elements, namely delay elements 35 and 40, which may be implemented as flip flops. As seen, the undelayed input is provided to a pair of logic elements 50a and 50b which in an embodiment can be XOR logic gates. In addition, a single-delayed output from delay element 35 is provided to first logic 50a and a twice-delayed output from second delay element 40 is provided to second logic 50b. In turn, a selected one of the two outputs is provided from selector 55, which can be controlled to provide some amount of randomization. By convolutionally coding this data, forward error correction (FEC) can occur in the receiver. In general, a convolutional decoder in the receiver may take the substantially symmetrical form to the coder shown in FIG. 1B.

Figure 1C:
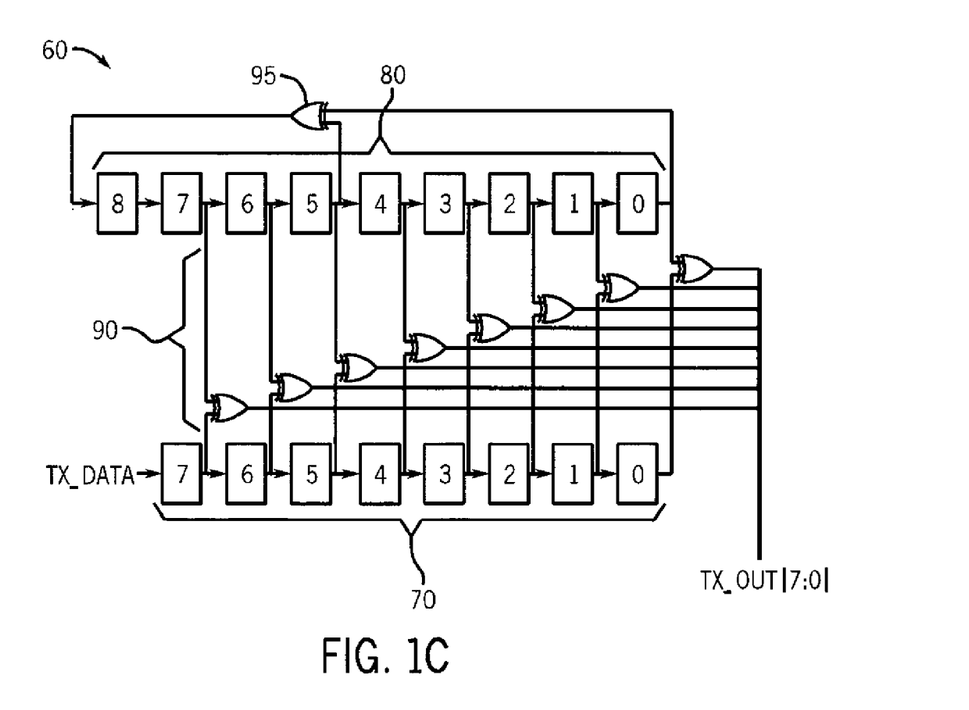
FIG. 1C is a block diagram of a logic unit used in a test arrangement in accordance with another embodiment.

Referring now to FIG. 1C, shown is a block diagram of another type of logic unit, namely a whitening unit 60. In general, whitening unit 60 may, in addition to whitening the data, provide a parallelizing function. In this way, input serial data (Tx_Data) provided to a set of delay elements 70 (which in one embodiment can be implemented as a shift register) has outputs at each of its different taps provided to a first input of one of a corresponding set of logic gates 90, which in the embodiment shown may be XOR gates. As further seen, the second input to each of these corresponding logic gates may be an output from a random number generator 80, which can be implemented via a LFSR having a feedback coupled between its least significant and most significant bits via another logic gate 95, further receiving an input from a selected one of the taps. Thus in this way, whitened parallel data can be output from logic 60 (Tx_Out [7:0]). Of course, still other types of logic circuitry are possible in the other embodiments.

Figure 2:
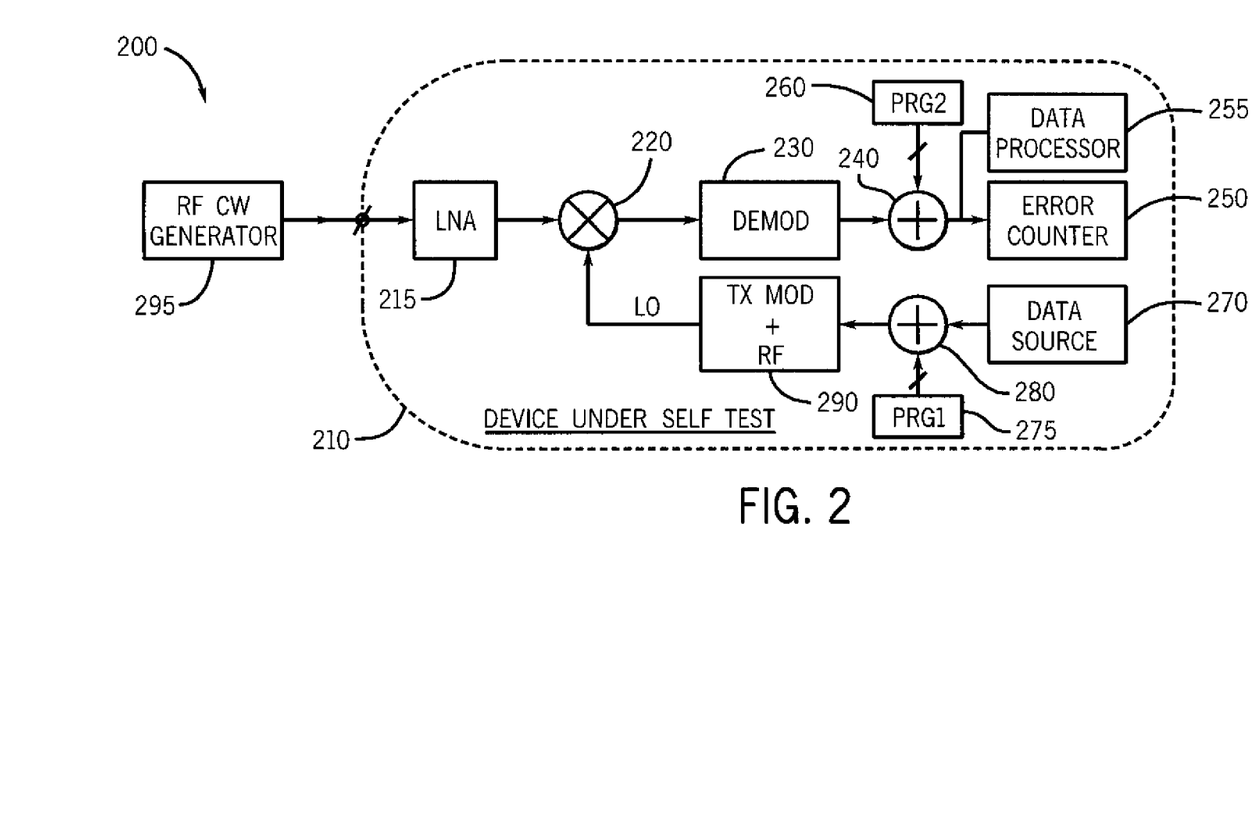
FIG. 2 is a block diagram of a test arrangement in accordance with another embodiment of the present invention.

Referring now to FIG. 2, shown is a block diagram of a test arrangement in accordance with another embodiment of the present invention. Specifically, FIG. 2 shows an embodiment in which a device can perform self-testing. More specifically, device 210 which may be a single-chip CMOS radio device (generally in accordance with radio devices 110 and 160, discussed above), may be configured to perform self-testing using minimal external circuitry, namely a relatively simple and inexpensive continuous wave (CW) RF generator 295.

As seen, radio device 210 may be a transceiver that includes both transmit circuitry and receive circuitry. The transmit circuitry may operate similarly to that discussed above with regard to radio device 110. Specifically, a data source 270 may provide a data pattern to a combinatorial logic 280, which further receives random data from a pseudo random generator 275. In the test mode, this data may be predetermined test data, e.g., a pattern of all logic low values. In turn, whitened data from combinatorial logic 280 may be provided to transmitter modulator and RF circuitry 290 which thus provides a RF signal. During normal operations, this RF signal would normally be transmitted from radio device 210, e.g., directly (assuming sufficient amplifier circuitry is present) or through an external power amplifier.

In the test mode shown however, this RF signal that is modulated with test data may act as a local oscillator (LO) for a downconversion mechanism, namely a mixer 220 of a receiver path. More specifically, the receiver path of radio device 210 may include a low noise amplifier (LNA) 215 configured to receive an incoming RF signal. In the test mode arrangement shown in FIG. 2, the incoming RF signal may be a CW RF signal from generator 295. Accordingly, mixer 220 may mix the two RF signals to thus downconvert the modulated RF signal from RF circuitry 290 to a lower frequency, e.g., a low intermediate frequency (IF) or a zero IF signal, which can be provided to a demodulator 230. In turn, demodulator 230 demodulates the data according to the given modulation scheme (e.g., FSK). Next, the demodulated data may be provided to a combinatorial logic 240, which is further coupled to receive a random data pattern from pseudo random generator 260. Accordingly, combinatorial logic 240 outputs de-whitened data which, during normal operation may be provided off-chip or to a data processor 255. In self-test operations however, the radio device may be configured when the output of combinatorial logic 240 is not as expected (e.g., a logic high for a given bit when an expected bit value is a logic low), to increment an error counter 250. Accordingly, at a conclusion of a test operation, the value stored in error counter 250 may correspond to a number of bit errors occurring during the test operation.

In an embodiment in which a single test packet is sent of a relatively long length, e.g., 100,000 or more bits long, the bit error rate may be determined by dividing the value stored in the error counter at the conclusion of the test packet by the total number of bits to thus obtain a BER. While shown with this particular implementation in the embodiment of FIG. 2, understand the scope of the present invention is not limited in this regard. For example, as described below additional or different testing such as a packet error rate (PER) test can be performed.

Figure 3:
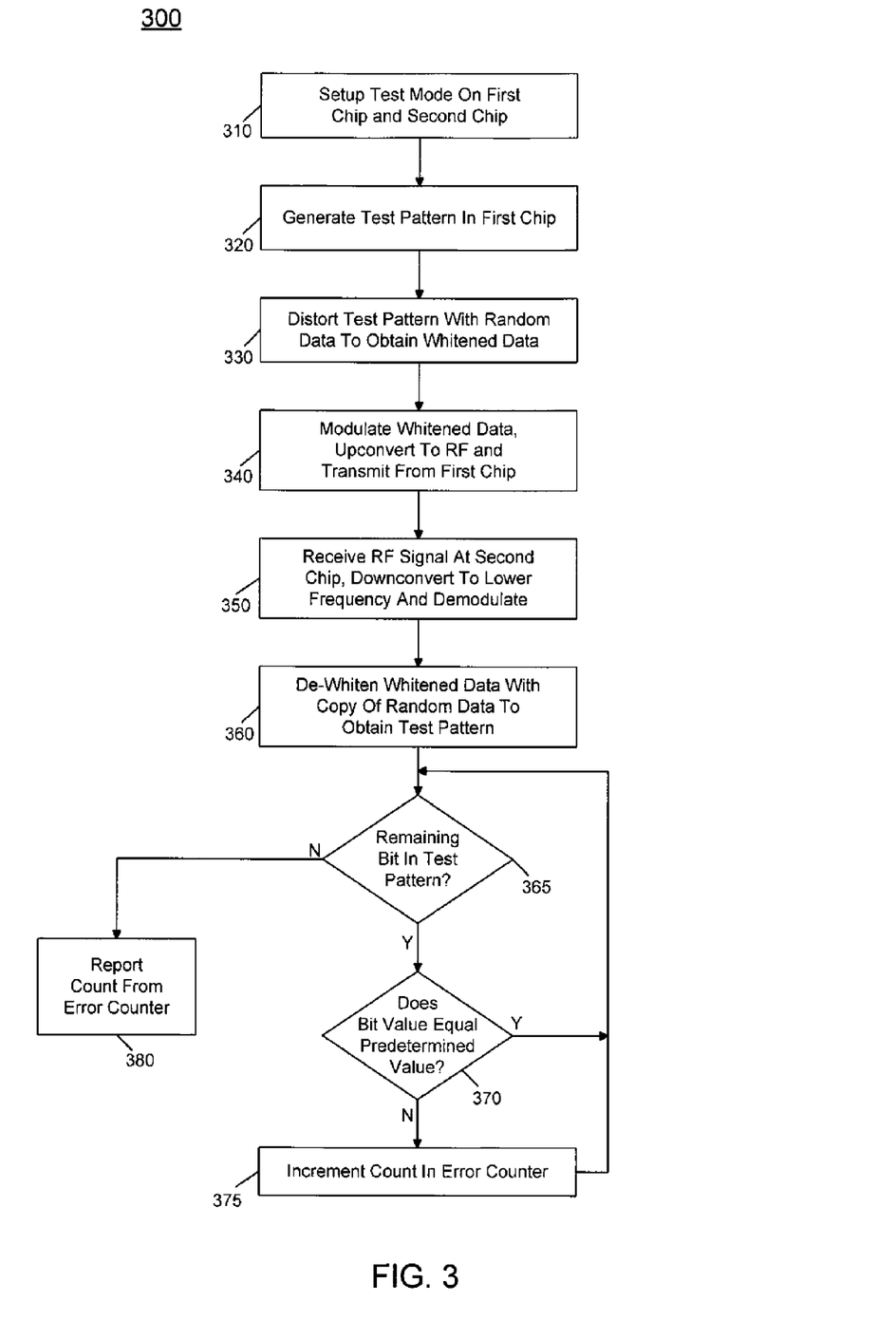
FIG. 3 is a flow diagram of a method for performing a companion chip test mode in accordance with an embodiment of the present invention.

Referring now to FIG. 3, shown is a flow diagram of a companion chip test mode in accordance with an embodiment of the present invention. More specifically, FIG. 3 shows a method 300 that can be used to perform radio tests for a first radio tuner implemented on a first IC, using a companion radio tuner IC. These two tuners may be ICs fabricated from a common semiconductor wafer, such as at a conclusion of a packaging operation of the devices.

As seen method 300 may begin by setting up a test mode on the first and second chips (block 310). Various operations may be performed to enable this test mode, such as setting values in certain configuration registers and so forth. In addition, via such settings, various switches within the radio devices can be enabled to provide for the generation of a test data pattern in the first chip and the handling of received test data in the second chip. Thus as seen, at block 320 a test pattern may be generated in the first chip. More specifically, this test pattern may be a predetermined test pattern that can correspond to a plurality of bits corresponding to one or more data packets. In one embodiment, a BER test can be implemented by generating a test packet having a large number of bits of a single logic value, e.g., 100,000 or more samples each having a logic low level, or multiple smaller packets can be provided to perform a PER test. Note that prior to the generation of a test pattern, a preamble and a synchronization word may be generated in the data source.

Still referring to FIG. 3, next at block 330 this test pattern may be distorted with random data. More specifically, in logic of the first chip, e.g., combinatorial logic, the test pattern may be combined with random data to obtain a payload of whitened data. Then at block 340 this whitened data may be provided to various circuitry of a transmitter portion of the first chip. Namely the whitened data may be provided to a modulator where it can be modulated according to a given modulation scheme. Then the modulated data can be upconverted to a RF frequency and then may be transmitted from the first chip.

Accordingly at this point, the RF signal that includes the modulated test data is transmitted. And thus the remainder of the operations discussed with regard to FIG. 3 is with respect to receipt and processing of the test data in a second chip, which may correspond to a radio device configured to receive and handle this test data. More specifically as seen in FIG. 3, control passes to block 350 where the RF signal can be received in the second chip. In addition, the RF signal can be processed in an analog front end of the second chip to thus handle various processing such as gain control and so forth, and further to downconvert the signal to a lower frequency. For example, the incoming signal can be downconverted via an analog front end mixer to a low IF or zero IF signal. In turn, this lower frequency signal can be provided to a demodulator, which may operate to demodulate the lower frequency signal to thus obtain whitened data that corresponds to the test data as distorted in the first radio device. While not shown for ease of illustration in the embodiment of FIG. 3, in various embodiments the demodulator may also analyze the demodulated data to determine the receipt of a preamble and synchronization word. To enable accurate de-whitening, the synchronization word can be used to synchronize the combinatorial logic. That is, these two values of a predetermined pattern (which can be stored in the demodulator) can be used to determine their receipt in the receiver. Thus based on receipt and detection of these symbols, the demodulator can trigger generation of random data within a random number generator of the receiver chip. More specifically, the demodulator may send a control signal to the receiver's random number generator to cause a copy of the originally generated random data pattern to begin output from the receiver's random number generator, such that the two random number generators provide the same data pattern at different phases. Accordingly, at each clock pulse beginning from this control signal, another bit of the random data pattern is output from the random data generator to the combinatorial logic. In embodiments using a different type of logic such as a convolutional coding mechanism, a similar synchronization process may be performed to begin decoding in the convolutional decoder.

At this point, control passes to block 360 where the whitened data can be de-whitened in the combinatorial logic with the copy of the random data that was used to whiten the data. Thus the test pattern that was originally generated in the first chip is obtained.

Then the received test pattern can be provided to comparison circuitry, which may be part of the combinatorial logic, associated with an error counter or configured between these two components. First it may be determined at diamond 365 whether there are remaining bits in the test pattern. If so, control passes to diamond 370 where it may be determined whether the corresponding bit value equals the predetermined value. If so, control passes back to diamond 365. Otherwise if a given sampled bit is of the incorrect value, for example a logic one was detected although the expected bit was to be a logic zero, control passes to block 375 where an error counter count may be incremented accordingly.

At the conclusion of processing of all bits of a test pattern, control passes to block 380, where a count corresponding to the error count for the test packet can be reported from the error counter. While shown with this particular implementation in the embodiment of FIG. 3, understand the scope of the present invention is not limited in this regard. Note that the count determined at block 380 may be reported to various circuitry, such as a controller of the radio device that can in turn output this information, which can be used to determine a BER for the receiver portion of the second chip.

Of course the same test procedure may be implemented in reverse to enable testing of the BER for the first chip. Also, instead of a single large test packet, other embodiments may transmit multiple smaller test packets. In turn if a packet is received (after de-whitening) with one or multiple logic high values in the payload, the packet is regarded as erroneous. The number of erroneous packets divided by the total number of transmitted packets corresponds to a packet error rate (PER). Furthermore, understand that while described herein with regard to receiver sensitivity testing such as a BER test, the scope of the present invention is not so limited and other implementations may be used to perform other testing such as receive sensitivity, receive selectivity, receive blocking, co-channel selectivity or so forth.

Figure 4:
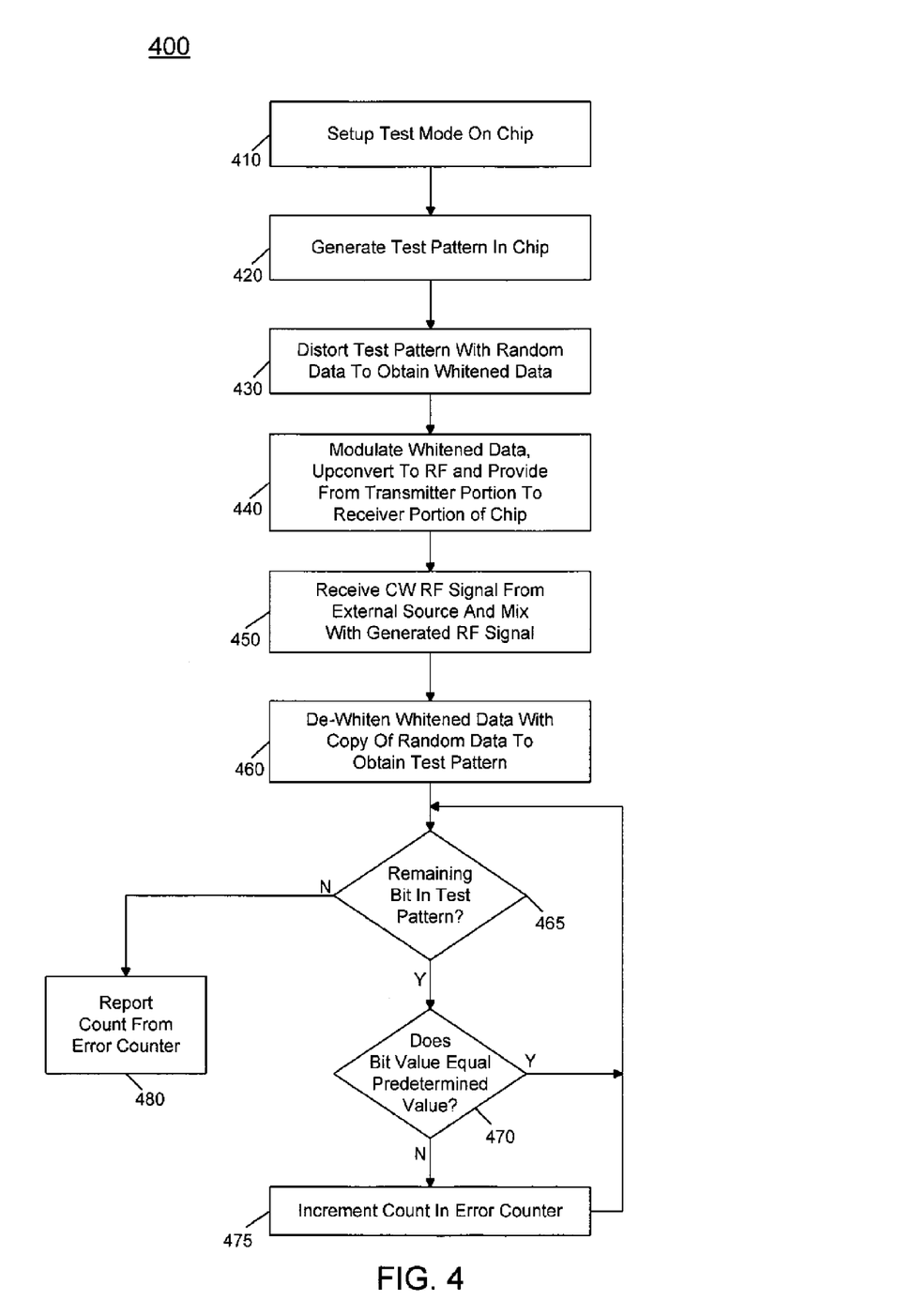
FIG. 4 is a flow diagram of a method for performing self testing of a radio device in accordance with an embodiment of the present invention.

Other embodiments can be used to perform self testing of a single receiver device such as a single chip radio tuner. Referring now to FIG. 4, shown is a flow diagram of a method for performing self testing of a radio device in accordance with an embodiment of the present invention. Method 400 may begin at block 410 by setting up a test mode on the chip. In this self-test mode operation, the radio device may be configured such that both its transmit circuitry and receive circuitry are active at the same time. More specifically, to perform self testing a loopback arrangement of the chip can be configured to, generally, generate test data, whiten the test data, modulate the whitened test data, upconvert the modulated whitened test data and provide this upconverted signal at an RF frequency to a mixer. In the mixer, it can be mixed with an incoming RF test signal, which may correspond to a continuous wave (i.e., unmodulated) RF signal, e.g., received from an off-chip RF generator.

Thus as shown in FIG. 4, after setting up the test mode, testing may be performed by generating a test pattern in the chip (block 420). This data pattern may be distorted with random data to obtain whitened data (block 430). Next, the whitened data may be modulated, converted to an RF signal and provided from the transmitter portion to the receiver portion of the chip (block 440). That is, a switch or other mechanism in the chip can be set up during the test mode to cause the RF signal to be provided to the analog front end of the receiver portion of the chip. For example, the RF signal can be provided to a LO input of a mixer of the analog front end.

As further seen in FIG. 4, an incoming continuous wave RF signal may be received, e.g., from an external CW RF generator, and mixed with the test RF signal (block 450). Accordingly, a downmixed signal, which may be at an IF frequency can be received. Control passes to block 460, where the whitened data may be de-whitened with a copy of the random data to thus recover the original test pattern. Note that various synchronization operations as discussed above may be performed to cause the combinatorial or other logic which performs the de-whitening to receive a synchronized version of the data pattern replica along with the appropriate bits of the whitened data.

Then the received test pattern can be provided to comparison circuitry, where it may be determined at diamond 465 whether there are remaining bits in the test pattern. If so, control passes to diamond 470 where it may be determined whether the corresponding bit value equals the predetermined value. If so, control passes back to diamond 465. Otherwise if a given sampled bit is of the incorrect value, control passes to block 475 where an error counter count may be incremented accordingly.

At the conclusion of processing of all bits of a test pattern, control passes to block 480, where a count corresponding to the error count for the test packet can be reported from the error counter. While shown with this particular implementation in the embodiment of FIG. 4, understand the scope of the present invention is not limited in this regard.

Note that certain differences exist in a self-test mode as compared to the testing mode discussed above with regard to FIG. 3. Most clearly, because the input of the received RF signal from the test generator is an unmodulated RF signal and the generated RF signal on chip includes the modulated test data, the output of the mixer may cause the modulator output to be different than its expected output. That is, assume a FSK modulation scheme, in a normal mode of operation when an incoming RF signal has a frequency greater than its carrier frequency, this indicates a logic high data value. And by the same token, when the incoming RF frequency is below the carrier frequency, this indicates a data value of logic zero. In contrast, when the modulated data is provided via an LO input into the mixer, the opposite situation will occur, namely when the incoming modulated signal is of a logic high value, the demodulated value will appear as a logic low value. Accordingly, different mechanisms for handling this inconsistency can be present. In one embodiment, an inverter may be switched into the receiver chain after the demodulator to thus invert the demodulator output to enable the signal provided to the combinatorial logic to be as expected. In other implementations, both for a test pattern as well as for preamble and synchronization data, the transmitter portion may invert its data pattern prior to sending them along to its associated combinatorial logic.

Figure 5:
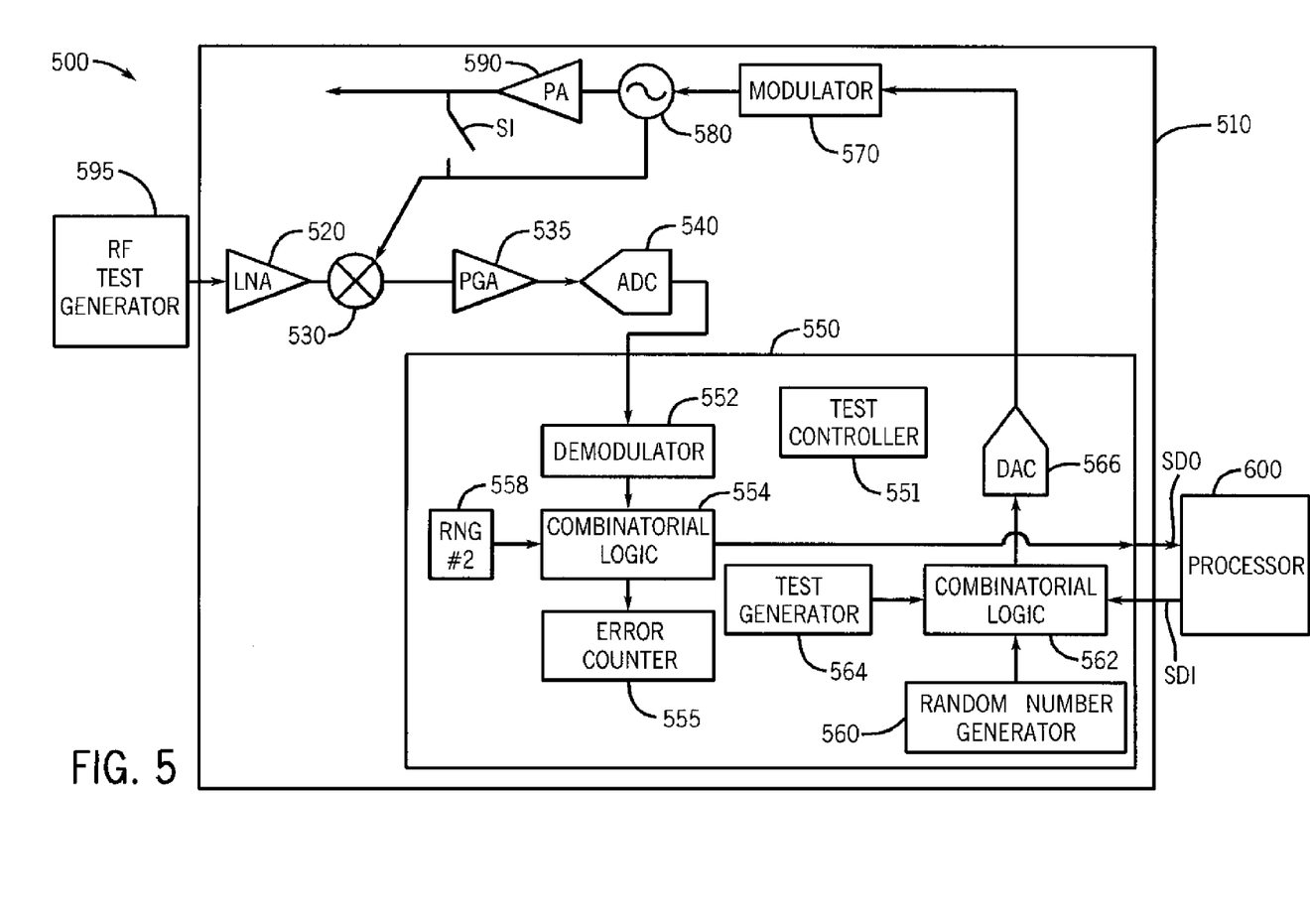
FIG. 5 is a block diagram of a transceiver in accordance with an embodiment of the present invention.

Embodiments can be incorporated in many different types of tuners. In some implementations, the tuner can be part of a single-chip transceiver that includes both transmit and receive circuitry. Referring now to FIG. 5, shown is a block diagram of a transceiver in accordance with an embodiment of the present invention that can be used for performing self-testing or other production tests as described above. Specifically, FIG. 5 shows a test arrangement 500 in which a transceiver 510 is configured for self test operations via generation of a test pattern within the transceiver. In addition, the transceiver is configured to receive an incoming CW RF signal from a RF test generator 595, e.g., via an antenna input (RX) port of the transceiver. In various embodiments, the test generator can be directly coupled via a test probe to a pad of transceiver 510. Or in other embodiments the transceiver can be connected to an antenna that receives the CW RF signal from the test generator.

With reference first to the receive circuitry of the transceiver, incoming RF signals are provided to an LNA 520, which can be programmably controlled to provide a desired amount of gain to an incoming RF signal. In the test arrangement shown in FIG. 5, this incoming RF signal is thus at a CW RF frequency. From LNA 520, the signal is provided to a mixer 530 where it can be mixed with a test signal output from a power amplifier (PA) 590, received in the mixer via a switch S1. In various embodiments, switch Si may be a MOSFET device such as an NMOS or PMOS device that can be controlled to be closed during a test mode to thus enable the PA output to be provided as a mixing signal to mixer 530. Instead during normal operations, an incoming RF signal can be downmixed using a LO signal generated from an oscillator 580.

With reference to testing operations, the downmixed signal at IF frequency can be provided through various receive path circuitry including a programmable gain amplifier (PGA) 535 which may have a programmable gain. In turn, the receive path includes an analog-to-digital converter (ADC) 540 where the signal can be digitized. Then the digital output can be provided to digital circuitry 550. In various embodiments, the digital circuitry can be implemented via a digital signal processor (DSP) or other digital circuitry. In the receive path shown, the signals may be provided to a demodulator 552 that performs demodulation and thus provides in a testing circumstance demodulated but whitened test data that is provided to a combinatorial logic 554, where it can be combined according to a given one or more logic functions with a random data pattern generated in a random number generator 558. As above, this random data pattern may be the same pattern that is used to whiten the data. Accordingly, the output of combinatorial logic 554 may correspond to de-whitened data. In the testing mode, when the de-whitened output of the combinatorial logic 554 is not as expected, a signal may be sent to an error counter 555 to increment a count of erroneous bits. Note that in normal operation, the error counter may not be active. Instead, de-whitened data, which may correspond to received radio signals can be sent to other circuitry of the system, e.g., via a serial bus such as a SPI bus via a serial data output (SDO) line coupled to a pad of transceiver 510. While not shown, in various embodiments the SPI bus may form a data path between the transceiver and a processor of a system such as a monitor, reader, security system, remote control device, or so forth. In some embodiments, testing may be initiated responsive to control information received from this processor, or testing can be controlled via a test arrangement (prior to incorporation of the transceiver into a system).

FIG. 5 further shows a transmit path. In a test mode, a test pattern can be provided to a combinatorial logic 562 from a test generator 564. Although shown with this specific test generator, understand the scope of the present invention is not limited in this regard and in other embodiments the test pattern can be received from off chip via a serial data input (SDI) line coupled to another pad of the transceiver. In either case, the test data provided to combinatorial logic 562 may be combined with random data received from a random number generator 560. Also note that while two different random number generators are shown in the implementation of FIG. 5, in other implementations a single random number generator can be provided to pass the same random number pattern to both the transmit circuitry as well as the receive circuitry. In such implementations appropriate delay circuitry may be present with regard to the transmit path to enable synchronization of this random data pattern with the received data via the receive path.

After whitening in combinatorial logic 562, the whitened test data may be provided through a digital-to-analog converter (DAC) 566. The resulting analog information may be provided to a modulator 570 for modulation according to a given modulation scheme. From there the signal can be upconverted in an oscillator 580. In turn, an RF test signal can be amplified in PA 590 and then coupled in a loop back manner via switch S1 during testing mode. Note that while shown at this high level, understand that certain details of an actual transceiver are omitted for ease of discussion. For example, in another embodiment, instead of DAC 566, a delta sigma modulator may be provided. And instead of an oscillator 580, a phase lock loop (PLL), e.g., a fractional-N PLL that includes a phase frequency detector, a charge pump, and a low pass filter that in turn may be coupled to a voltage controlled oscillator (VCO) can instead be present, rather than the simple oscillator shown in FIG. 5. Additional circuitry may be present in a particular implementation but is not shown in the embodiment of FIG. 5 for ease of illustration.

Note that testing operations may be under control of a test controller 551 within digital circuitry 550. In various embodiments, test controller 551 may include or may be coupled to a non-transitory storage medium that stores instructions to perform various test modes, such as described above with regard to FIGS. 3 and 4. In turn this test controller may operate responsive to control signals received from off-chip, e.g., from a processor of a system in which the transceiver is present. Or, in a testing environment for a standalone transceiver chip, various control signals may be sent to test controller 551 to thus configure the transceiver for self-test operations. Such configuring includes the control of test generator 564 to generate a predetermined test pattern, switching of switch S1 to enable the test RF signal to be looped back to mixer 530 (and disabling of the LO signal directly from oscillator 580 to mixer 530). Other configuration operations may be with regard to various gain control operations for testing such as receiver sensitivity testing, initializing error counter 555, obtaining an error count at a conclusion of a given test and so forth.

FIG. 5 further shows a processor 600, which may be a host processor of a system in which transceiver 500 is incorporated. Data may be communicated between processor 600 and transceiver 500 via a data path coupled between the devices. Although shown as part of the test arrangement in FIG. 5, understand that in various embodiments testing of a transceiver as discussed above can be performed before the transceiver is incorporated into a system such as a computing system that further includes processor 600.

Thus in various embodiments, a very limited amount of hardware (e.g., the error counter and control switches) may be the only circuitry provided in addition to the normal operation transmit and receive paths of the radio device to enable testing in accordance with an embodiment of the present invention. Furthermore embodiments may realize a test mode operation without the generation and transmission of complex data patterns such as cyclic redundancy or other checksums. In addition, no associated timing circuitry is used for purposes of the test mode, as instead the preamble and synchronization word, also generated during normal radio operations, can be used to enable appropriate timing operations for a test mode.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an analog front end to receive a radio frequency (RF) signal and to downconvert the RF signal to a second frequency signal;
   a demodulator coupled to the analog front end to receive and demodulate the second frequency signal to obtain demodulated samples, wherein the demodulator is to demodulate synchronization information present in the second frequency signal;
   a logic circuit coupled to the demodulator to receive the demodulated samples and to perform a logic operation on each of the demodulated samples to generate a logic output, wherein the logic circuit is synchronized using the synchronization information; and
   a storage medium coupled to the logic circuit to store a count of a number of the logic outputs having a first value, wherein the count corresponds to a number of the demodulated samples having an error.

2. The apparatus of claim 1, wherein the storage medium comprises an error counter to count bit errors in the RF signal.

3. The apparatus of claim 1, wherein the logic circuit comprises an exclusive-OR (XOR) function, the XOR function to receive the demodulated samples and a value obtained from a number generator, wherein the value corresponds to a pseudo random value that is combined with a test data pattern in a test transmitter that transmits the RF signal.

4. The apparatus of claim 3, wherein the demodulator is to demodulate a synchronization word in the second frequency signal and to cause initiation of the number generator responsive to the synchronization word to generate the value.

5. The apparatus of claim 3, wherein the number generator comprises a pseudo random generator including a linear feedback shift register having a number of bits, a number of taps, and a position of taps equal to a corresponding number of bits, number of taps, and position of taps of a pseudo random generator of the test transmitter, and wherein the pseudo random generator and the pseudo random generator of the test transmitter use a common seed value.

6. The apparatus of claim 3, wherein the apparatus comprises a transceiver and the test transmitter is part of the transceiver, and the transceiver further includes a second logic circuit coupled to a data source to receive the test data pattern and further coupled to a second number generator to generate a second value, the second logic circuit to generate a second logic output.

7. The apparatus of claim 6, wherein the transceiver further includes a modulator to modulate the second logic output and RF circuitry to provide a modulated RF signal to a mixer of the analog front end.

8. The apparatus of claim 7, wherein the mixer is further coupled to receive a second RF signal from a test generator coupled to the transceiver and to mix the modulated RF signal with the second RF signal to generate the second frequency signal.

9. The apparatus of claim 8, further comprising an inverter coupled to the demodulator to invert the demodulated samples during a test mode when modulation is according to a frequency shift keying (FSK) modulation.

10. The apparatus of claim 1, wherein the logic circuit comprises a convolutional decoder to decode the demodulated signals when triggered by detection of the synchronization information.

11. The apparatus of claim 1, wherein the apparatus is to determine a bit error rate based on the count stored in the storage at a conclusion of a test payload.

12. The apparatus of claim 1, wherein the apparatus is to determine a packet error rate based on a number of received packets having at least one sample for which the logic output was not of a predetermined value.

13. A method comprising:
    receiving a radio frequency (RF) transmitted from a transmitter and mixing the RF signal with a mixing signal to obtain a second frequency signal in a receiver, wherein the RF signal includes modulated whitened data obtained by combining a test pattern of a test packet with random data;
    demodulating the second frequency signal and detecting a synchronization message in the second frequency signal;
    initiating a random generator to generate a copy of the random data responsive to detecting the synchronization message;
    de-whitening the demodulated second frequency signal with the copy of the random data to obtain the test pattern; and
    incrementing an error counter value for each sample of the obtained test pattern that does not equal a predetermined value.

14. The method of claim 13, further comprising using the error counter value to determine a bit error rate of the receiver.

15. The method of claim 13, wherein the RF signal is transmitted from a transmit path of a transceiver and receiving the RF signal comprises receiving the RF signal in a receive path of the transceiver.

16. The method of claim 15, further comprising receiving a second RF signal in the transceiver from an external test generator and using the RF signal as the mixing signal.

17. The method of claim 16, further comprising inverting the demodulated second frequency signal when modulation is according to a frequency shift keying (FSK) modulation.

18. A system comprising:
    a transceiver formed on a semiconductor die, the transceiver including receiver circuitry, the receiver circuitry comprising:
      an analog front end to receive a radio frequency (RF) signal and to downconvert the RF signal to a second frequency signal, a demodulator to receive and demodulate the second frequency signal to obtain demodulated samples, a logic circuit to receive the demodulated samples and to combine each of the demodulated samples with a pseudo random value to generate a logic output, the pseudo random value synchronized according to synchronization information in the demodulated samples, and an error counter to store a count of a number of the logic outputs not having a predetermined value;
    the transceiver further including transmit circuitry comprising:

a second logic circuit to receive test data and a second pseudo random value and to generate a second logic output, a modulator to modulate the second logic output and RF circuitry to provide a modulated RF signal to the analog front end during a test mode, the pseudo random value and the second pseudo random value having a same pattern; and a processor coupled to the transceiver and to communicate with the transceiver via a data path.

19. The system of claim 18, further comprising a switch to couple the modulated RF signal to the analog front end during the test mode and otherwise to direct the modulated RF signal to an output pad of the transceiver.

20. The system of claim 18, further comprising an inverter to invert the demodulated samples during the test mode.

* * * * *